United States Patent

[11] 3,532,111

| [72] | Inventors | George E. Hansen |
| | | Elmwood Park; |
| | | Peter A. Gaglio, Chicago, Illinois |
| [21] | Appl. No. | 805,525 |
| [22] | Filed | March 10, 1969 |
| [45] | Patented | Oct. 6, 1970 |
| [73] | Assignee | Crane Co. |
| | | Chicago, Illinois |
| | | a corporation of Illinois |

[54] CLAMPING DEVICE FOR VALVES
10 Claims, 8 Drawing Figs.

[52] U.S. Cl. .................................................. 137/385, 70/180
[51] Int. Cl. ...................................................... F16k 35/00
[50] Field of Search............................................ 137/383, 385; 70/175, 176, 177, 178, 179, 180

[56] References Cited
UNITED STATES PATENTS

| Re. 7,587 | 4/1877 | Hall............................... | 70/178 |
| 1,169,906 | 2/1916 | Anderson...................... | 70/180 |
| 1,432,621 | 10/1922 | Rath............................... | 70/180 |
| 1,636,427 | 7/1927 | Morrison....................... | 137/385X |
| 2,161,626 | 6/1939 | Loughner....................... | 70/180 |
| 3,156,256 | 11/1964 | Weaver.......................... | 70/177X |

Primary Examiner—William R. Cline
Attorney—George S. Schwind

ABSTRACT: A locking device for a valve assembly which comprises a spreadable clamp member adapted to substantially encircle a portion of the valve and cooperate with lug means positioned on the valve body. Locking means are provided on the clamp member to engage with the lug means and prevent said clamp member from axial or rotational movement. The locking device also includes aligned retaining means adapted to receive securing means such as a padlock or similar means, to releasably secure the locking device to the valve handle to prevent rotation thereof. In one disclosed embodiment the clamp member comprises a pair of pivotally joined arms, and in a modified embodiment the clamp member comprises a continuous return-bent strap member.

FIG. 3

Inventor
GEORGE E. HANSEN
PETER A. GAGLIO
BY
George S. Schwind
ATTY.

Patented Oct. 6, 1970
3,532,111
Sheet 2 of 2
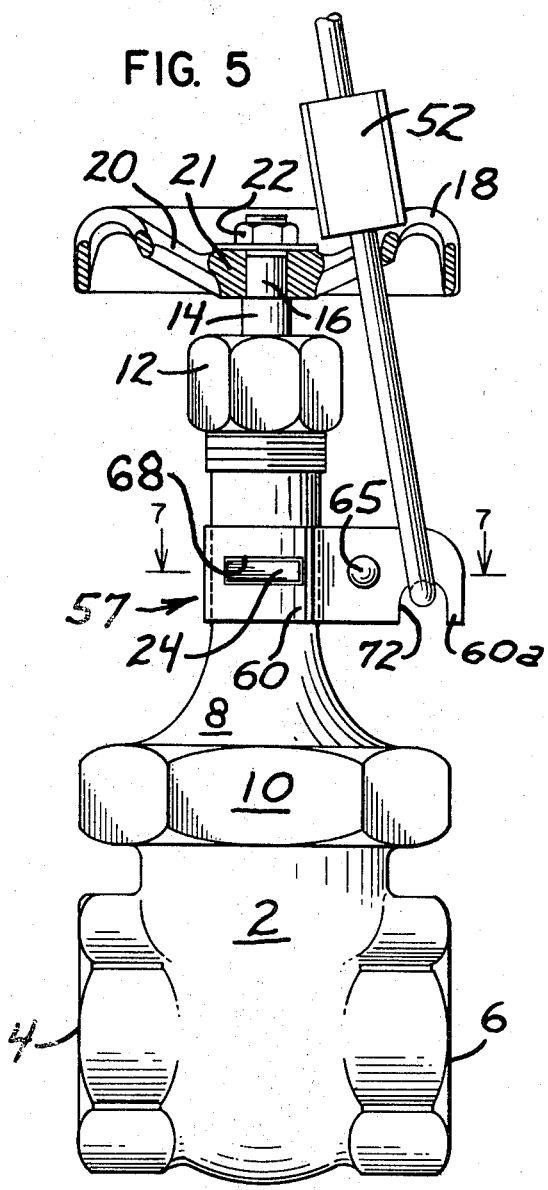
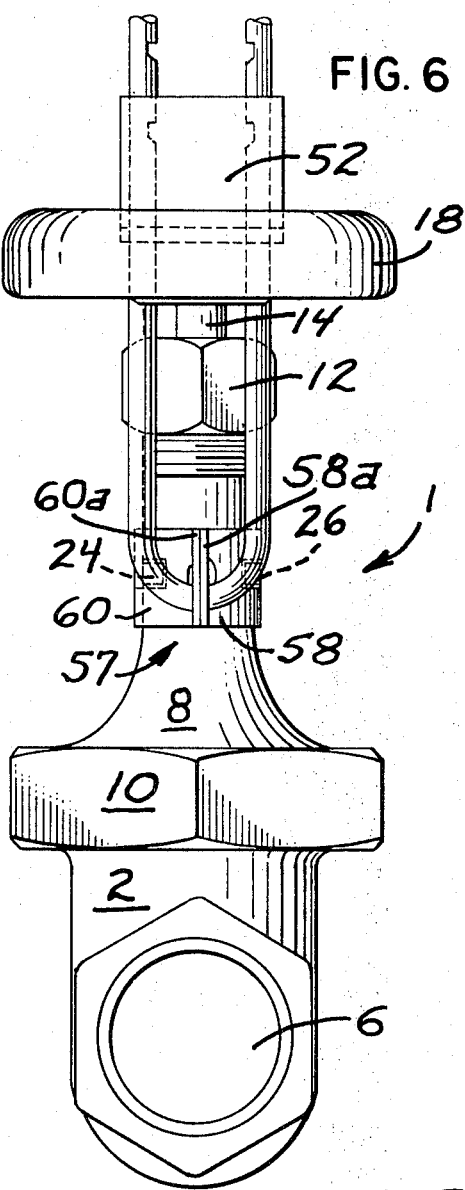
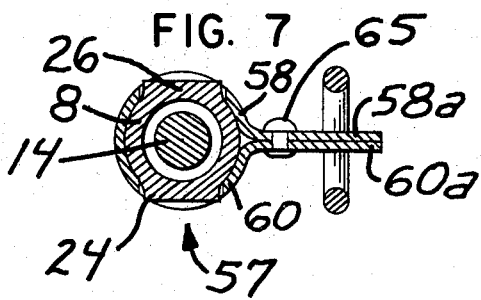
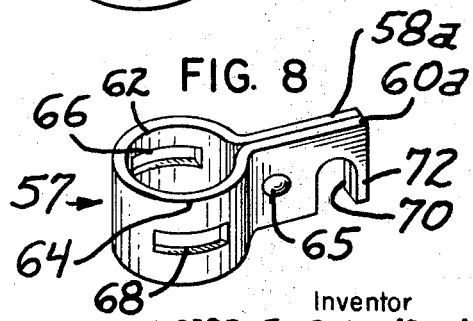
Inventor
GEORGE E. HANSEN
PETER A. GAGLIO
BY George J. Achwind
ATTY.

CLAMPING DEVICE FOR VALVES

BACKGROUND AND SUMMARY OF THE INVENTION

The present invention relates generally to a valve assembly and in particular to a novel device for locking a valve assembly in a predetermined position.

An object of the present invention is to provide a novel locking device for a valve assembly which is detachable and which may be readily installed in the field without dismantling of the valve, removing the valve from the line, or modifying any part of the valve. Such locking device, when installed, prevents tampering with the valve assembly or unauthorized actuation thereof.

Another object of the present invention is to provide a locking device which may which may be operated selectively to secure the handle means of a valve assembly in any desired position.

A further object of the invention is to provide a valve locking device which is simple and economical to manufacture and maintain.

Generally, the locking device embodying the features of this invention comprises a simple clamp member which is adapted to encircle a portion of the valve, such as the valve bonnet in engagement with lug means provided thereon. The lug means could, of course, be positioned on the valve body with a corresponding clamp member encircling the same. A padlock or similar securing means is also included to releasably secure the clamp member to the valve handle, to thereby lock the handle in a predetermined position.

EXEMPLARY EMBODIMENTS

Further objects and advantages of the present invention will be apparent from the following description of two exemplary embodiments thereof, reference being made to the accompanying drawings in which:

FIG. 5 is a side elevational view of a valve assembly showing a modified embodiment of the locking device secured to the assembly;

FIG. 6 is an end elevational view of the valve and locking device shown in FIG. 5;

FIG. 7 is a sectional view taken along lines 7-7 of FIG. 5; and

FIG. 8 is a perspective view of the locking device shown in FIGS. 5–7.

Figure 1:
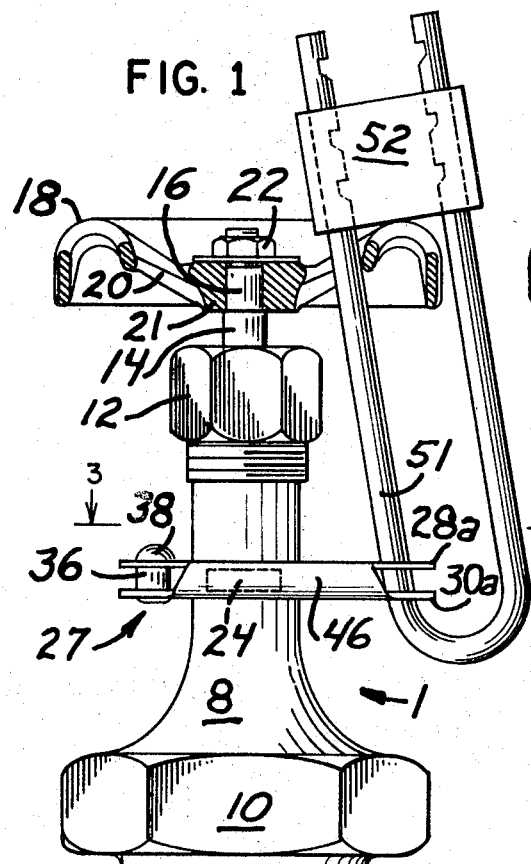
FIG. 1 is a side elevational view of a valve assembly showing the preferred embodiment of the locking device secured to the valve assembly.

Referring generally to the drawings, the same reference numerals have been used to identify components common to the first embodimet shown in FIGS. 1–4 and the second embodiment shown in FIGS. 5–8. A valve assembly adapted to incorporate the locking device in accordance with this invention, such as a gate, globe, or angle valve, is generally indicated by reference numeral 1. The valve assembly 1 includes a body portion 2 provided with a conventional inlet 4 and outlet 6, and also includes a bonnet 8 attached to the body 2 by a union ring 10. A packing nut 12 is threaded to the top portion of the bonnet 8, and a conventional valve stem 14 is positioned axially within the bonnet 8 and projects upwardly through the nut 12. The packing nut 12 is adapted to compress packing material positioned within the packing well of the bonnet 8, to form a seal between the bonnet 8 and the stem 14 in a manner well known in the art. A tapered shank portion 16 of the stem 14 provides a driving connection between the stem 14 and a handle means, such as a handwheel 18. The illustrated handwheel 18 is a conventional design having spaced spokes 20 extending from a central hub portion 21, and is secured to the valve stem 14 by means of a retaining nut 22.

The above-described elements of the valve assembly 1 are conventional valve components which are well known in the art. Of course, it will be understood that the present invention is not limited to use with this illustrated valve assembly but may also be utilized with other valve assemblies and the type of valve shown herein is for exemplary purpose only.

The valve assembly 1 also includes projecting lug means which receive the locking device in accordance with this invention. As seen in the drawings, in the preferred arrangement such lug means are cast integrally with the bonnet 8 and comprise opposed lugs 24, 26 which are positioned on opposite sides of the bonnet 8. As clearly shown in FIGS. 2, 3 and 7, the lugs 24, 26 blend into the contour of the bonnet 8, and are generally rectangular in shape, but could readily be square or any other selected configuration provided they project sufficiently from the valve. In the preferred arrangement, the lugs 24, 26 are the "chucking lugs" for the bonnet 8 which are utilized for positioning the bonnet in automated machinery when the bonnet is being machined.

As shown in FIGS. 1—4 of the drawings, the valve locking device in accordance with this invention comprises a spreadable clamp member 27 which defines a pair of aligned arms 28 and 30. When the locking device is installed on the valve assembly 1, the clamp member 27 encircles the bonnet 8 and the lugs 24, 26 are straddled by the clamp arms 28, 30 on all exposed sides in a manner which prevents axial and rotational movement of the locking device with respect to the valve assembly.

Figure 3:
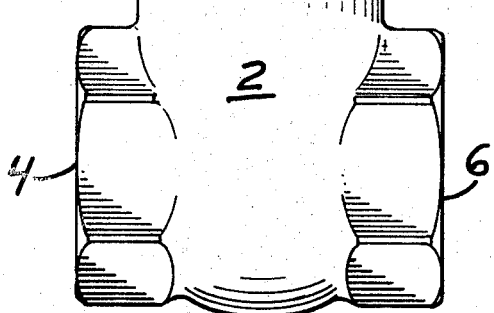
FIG. 3 is a sectional view taken along lines 3–3 of FIG. 1, showing the locking device positioned on the bonnet of the valve assembly.

Further, as shown in FIGS. 1 and 3, the clamp arms 28, 30 are dimensioned to define aligned free ends 28a and 30a, respectively, which project beyond the bonnet 8 when the clamp member 27 encircles the bonnet. In accordance with this invention, the free arm ends 28a, 30a include mated retaining means, in the form of apertures or recesses or the like, which are adapted to receive a securing device for securing the clamp arms 28, 30 together and thereby fix the clamp member 27 to the valve bonnet 8. The securing device is also adapted to releasably join the clamp 27 to the handwheel 18, to lock the handwheel in a predetermined position with respect to the clamp.

Figure 2:
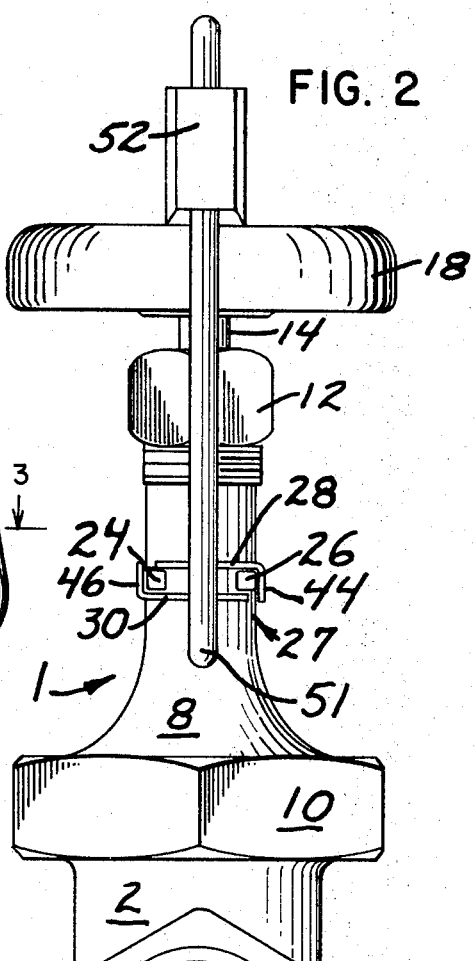
FIG. 2 is an end elevational view of the valve assembly and locking device shown in FIG. 1.
Figure 4:
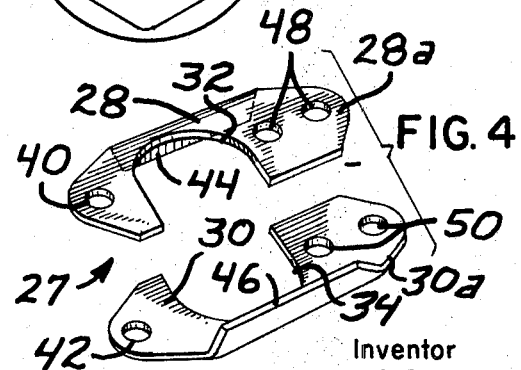
FIG. 4 is an exploded assembly view of the locking device shown in FIGS. 1–3.

Referring to the drawings in more detail, in the embodiment of the invention illustrated in FIGS. 1—4, the clamp arms 28, 30 are pivoted together at one end by means of a pivot pin 38, positioned in aligned holes 40, 42, as shown in FIG. 4. A spacer bushing 36 is positioned on the pin 38 between the arms 28, 30 and spaces the arms a predetermined distance apart depending on the height of the lugs 24, 26. As seen in FIGS. 1 and 2, the bushing 36 is dimensioned so that the opposed surfaces of the arms 28 and 30 grip the opposite sides of the adjacent lugs 26 and 24, respectively, when the clamp 27 is in position on the bonnet 8. The arms 28, 30 and the lugs 24, 26 will thereby prevent axial movement of the clamp 27 with respect to the valve assembly 1 when positioned thereon. The arms 28, 30 also include opposed recesses 32 and 34, respectively, which conform to the general contour of the bonnet 8 adjacent the lugs 24, 26 and which permit the arms to encircle the bonnet and straddle the lugs in the above-described manner.

In the embodiment illustrated in FIGS. 1—4, the clamp arms 28, 30 also have depending abutment flanges 44, 46, respectively, which are perpendicular to and integral with the respective arm and which extend toward the opposed arm. As clearly shown in FIGS. 2, 3 and 4, the abutment flanges 44 and 46 are arranged to engage with the sides of the adjacent lugs 24 and 26, respectively, to thereby prevent rotation of the clamp member 27 with respect to the valve assembly 1 when the locking device is secured thereto. The arms 28, 30 with the integral abutment flanges 44, 46 accordingly define locking means which engage with the valve lugs 24, 26 and preclude the clamp 27 from rotational movement with respect to the valve assembly 1. The unique design of such clamp arms and flanges thus prevent axial and rotational movement, respectively, of the clamp member on the valve.

The clamp arms 28, 30 in the first embodiment also have a plurality of apertures 48 and 50, respectively, which define the above-described retaining means for the clamp member 27. The apertures 48 and 50 are provided on the free ends of the arms 28, 30 and are positioned so that they become mated or aligned when the arms are encircled around the bonnet 8. The mated apertures 48 and 50 will thereby receive securing means such as the hasp 51 of a padlock 52 or the like, which secures the clamp 27 to the bonnet 8 and which locks the valve assembly 1 in a predetermined position. A plurality of holes 48 and 50 are provided on the arms 28 and 30 to accommodate variations in valve positioning and padlock adjustment.

When using the above-described embodiment of the locking device to lock the valve assembly 1 in a desired position, the handwheel 18 is rotated to a predetermined position and the hasp of the padlock 52 is passed through an aligned pair of holes 48, 50 on the clamp 27. The padlock hasp also is passed between spokes 20 of the handwheel 18. The padlock 52 is then drawn closed to releasably join the clamp member 27 to the handwheel 18. Such arrangement thus secures the handwheel 18 to the locking device in accordance with this invention and prevents unauthorized actuation of the handwheel 18. It is understood that the securing means could readily be a chain which may be inserted through the aligned apertures and the ends of which could be padlocked through the end links positioned adjacent the handwheel.

The embodiment of the locking device illustrated in FIGS. 5—8 is adapted for use with the above-described valve assembly 1. In this embodiment the spreadable clamp member 57 comprises a continuous elongated strap which is return-bent to form a pair of aligned arms 58 and 60. The free ends 58a and 60a of the arms are arranged to be spaced in substantially parallel relationship when the clamp member 57 is positioned on the valve bonnet 8. In addition, the arms 58 and 60 adjacent the bend are provided with pre-formed recesses 62 and 64, respectively, which conform to the general contour of the bonnet 8 adjacent the lugs 24 and 26. As illustrated in FIGS. 5 and 7, a fastener such as a rivet 65 also is provided to join the free arm ends 58a and 60a together in a manner which fixes the clamp member 57 in an encircling position around the bonnet 8.

As seen in FIGS. 5—8, the means for locking the clamp member 57 onto the lugs 24, 26 in this embodiment comprises a pair of aligned apertures 66 and 68. The apertures 66, 68 are formed in the arms 62 and 64, respectively, and are dimensioned so that the lugs 24, 26 will project into the adjacent aperture and will be firmly positioned and inserted therein when the clamp member 57 encircles the bonnet 8. By such an arrangement, the lugs 24, 26 engage with the clamp member 57 and lock the member from rotational or axial movement with respect to the valve assembly 1.

The construction of the embodiment of the locking device shown in FIGS. 5—8 is completed by providing the clamp member 57 with means for retaining a securing device such as the hasp of the padlock 52. In this regard, as shown clearly in FIG. 8, the free ends of the arms 58 and 60 include recesses 70 and 72, respectively, which are arranged to be in alignment when the clamp member 57 is encircling the valve bonnet 8. The aligned recesses 70 and 72 are thereby adapted to receive the hasp of the padlock 52 or other suitable securing means.

When the second embodiment of the locking device is used to lock the valve assembly 1 in a predetermined position, the clamp member 57 is placed around the bonnet 8 so that the apertures 66 and 68 receive the lugs 24, 26. The free arm ends 58a and 60a are then fastened together by means such as the rivet 65 to assure that the clamp member 57 is fixed to the valve bonnet 8. Then, after the handwheel 18 has been rotated to a predetermined position, the hasp of the padlock 52, or other suitable securing means, is passed between adjacent spokes 20 on the handwheel. The hasp of the padlock also is placed within the aligned recesses 70, 72 on the free arm ends 58a and 60a. The padlock 52 is then drawn closed to thereby releasably join the clamp member 57 to the handwheel 18 and lock the handwheel in a predetermined position. Again, a chain may be used in place of a padlock by merely inserting one end link in recess 70, 72 and positioning the free end through handwheel spokes 20, drawing the chain taut and securing a padlock with a short hasp through the link adjacent the handwheel.

Although two embodiments of the locking device in accordance with this invention have been described above with a certain degree of particularity, it should be understood that the present disclosure has been made only by way of example. Consequently, numerous changes in the details of construction and the combination and arrangement of components as well as the possible modes of utilization will be apparent to those familiar with the art, and may be resorted to without departing from the spirit and scope of the invention as claimed.

We claim:

1. A locking device for a valve including a bonnet, a stem extending axially into the bonnet, handle means for turning the stem, and lug means projecting from the valve, said locking device comprising:

a spreadable clamp member having a pair of aligned arms adapted to substantially encircle a portion of said valve adjacent the projecting lug means so that each arm has a free end extending beyond the encircled valve portion;

locking means on said clamp member to receive and engage with the projecting lug means to lock said clamp member against axial rotational movement with respect to said valve, said clamp member comprising a continuous elongate strap member return-bent to form said spreadable arms and formed to provide a recess adjacent the bent portion for receiving said portion of the valve between said arms and wherein said strap member is further formed to space said retaining means in the free ends of said arms in substantial alignment when said locking device encircles the body; and retaining means positioned adjacent said free ends of said arms and alignable with the arms in said encircling condition for receiving securing means to releasably join said clamp member to the handle of the valve, to thereby prevent rotation of the valve handle.

2. A locking device in accordance with claim 1 wherein said locking means comprises an aperture provided in said strap member adjacent said recess and adapted to engage the lug means on the valve to prevent axial and rotational movement of said clamp member on the valve.

3. A locking device in accordance with claim 2 wherein said locking means comprises a pair of opposed apertures provided in said strap means adjacent said recess.

4. In a valve assembly including a bonnet, a stem extending axially into the bonnet, handle means for turning the stem, a device for locking the valve handle in a predetermined position comprising:

lug means projecting from said valve;

a spreadable clamp member having a pair of aligned arms substantaially encircling a portion of said valve adjacent said lug means so that each arm has a free end extending beyond the encircled valve portion;

locking means on said clamp member cooperating with said lug means to lock said clamp member against axial and rotational movement;

aligned retaining means on said arms adjacent said free ends; and securing means connected to said arms through said retaining means and releasably joined to said valve handle to prevent rotation of said handle with respect to said clamp member.

5. A valve assembly in accordance with claim 4 wherein said securing means comprises a padlock extended between said retaining means on said arms and said valve handle.

6. A valve assembly in accordance with claim 4 wherein said lug means comprises a pair of opposed lug members projecting from opposite sides of said valve bonnet.

7. A valve assembly in accordance with claim 6 wherein said arms of said clamp member comprise elongate strap members pivotally joined at one end and provided with recesses intermediate the joined and free ends for receiving said valve bonnet between said arms, and wherein said retaining means on said free ends of said arms comprise aligned openings.

8. A valve assembly in accordance with claim 7 wherein said strap members comprising said arms are spaced axially and are engaged with opposite surfaces of said opposed lug members to prevent axial movement of said clamp member, and wherein each of said strap members includes an axially extending abutment shoulder engaged with the adjacent lug member to prevent rotation of said clamp member.

9. A valve assembly in accordance with claim 8 wherein said clamp member comprises an elongate continuous strap member return-bent to substantially encircle said bonnet adjacent said lug members and to form aligned arms projecting beyond said bonnet, and wherein said locking means comprises a pair of opposed apertures in said strap member receiving said opposed lug members to prevent axial and rotational movement of said strap member on said bonnet.

10. A valve assembly in accordance with claim 9 wherein said retaining means comprises aligned openings in the free ends of said strap member receiving said securing means.